United States Patent
Dailey et al.

(10) Patent No.: US 7,223,920 B2
(45) Date of Patent: May 29, 2007

(54) THROUGH-BOLT INSULATING BOOT

(75) Inventors: George F. Dailey, Pittsburgh, PA (US); Louis R. Rubio, Monroeville, PA (US)

(73) Assignee: Siemens Power Generation, Inc., Orlando, FL (US)

( * ) Notice: Subject to any disclaimer, the term of this patent is extended or adjusted under 35 U.S.C. 154(b) by 25 days.

(21) Appl. No.: 11/156,339

(22) Filed: Jun. 17, 2005

(65) Prior Publication Data

US 2006/0283623 A1 Dec. 21, 2006

(51) Int. Cl.
*H05K 7/14* (2006.01)
(52) U.S. Cl. .................. 174/138 D; 174/135; 439/521; 439/135
(58) Field of Classification Search ............ 174/138 D, 174/135, 74 R, 77 R, 72 R, 138 F, 76; 439/521, 439/135
See application file for complete search history.

(56) References Cited

U.S. PATENT DOCUMENTS

| 4,952,828 | A |   | 8/1990 | Yu-Fang |
|---|---|---|---|---|
| 5,230,142 | A | * | 7/1993 | Roscizewski ................ 29/758 |
| 5,859,483 | A |   | 1/1999 | Kilman |

* cited by examiner

*Primary Examiner*—Jinhee Lee

(57) ABSTRACT

The present invention provides for an insulating boot 20 for ends of through-bolts 12 in electric generators that comprises a shaped insulating boot. The boot has an inner surface and an outer surface and an opening, where the inner surface is substantially free of protrusions. The inner surface of the shaped boot 20 is within 0.01 to 0.5 inches (0.025–1.3 cm) larger than the shape of the end of a through-bolt 12 to which the shaped boot will be applied. The shaped insulating boot has a breakdown voltage of at least 10 kV, and more particularly at least 30 kV, and the shaped boot is placed over the end of a through-bolt of an electric generator.

7 Claims, 2 Drawing Sheets

THROUGH-BOLT INSULATING BOOT

FIELD OF THE INVENTION

The field of the invention relates to generator stator core through-bolts.

BACKGROUND

Large electric generators are composed of windings that are capped off with flux traps (end shields) on either end. The flux traps are composed of many layers of insulation coated metal plates that are tightly stacked together, and usually bolted and/or bonded. Along the flux trap perimeter, hollows are present to allow for the through-bolts which provide the main compression for the stator laminations by tightly holding the opposing end plates together.

FIGS. 1A and 1B illustrate this section of the generator. The flux trap 2 is composed of a series of stacked laminations 4 which in this example are bolted together 6, as well as being bolted to the end plate 14 of the generator core. Pockets 8 along the perimeter of the flux trap 2 make room for through-bolts 12 which bind and compress the end plates 14. The entire flux trap is then covered with a support cone (not shown) which is composed of non-conducing materials, such as fiberglass.

During the operation of a generator, the individual laminations 4 of the flux trap have been known to migrate. As they migrate they can come into contact with the through-bolt 6, including the through-bolt nut and through-bolt washer. If this occurs at both ends of a generator core, then a short is created and the generator gets severely damaged, including the melting of the through-bolt and surrounding flux trap and end plate.

Attempts have been made in the prior art to better secure the laminations of the flux trap together to prevent migration. Unfortunately migration can continues to occur and generators become damaged and need to be shut down and repaired. What is needed is a method and apparatus that prevents damage to the generator from lamination migration. What is also further needed is a method and apparatus of retrofitting existing generators with the preventative measure.

Other difficulties with the prior art also exist, some of which will be apparent upon further reading.

SUMMARY OF THE INVENTION

With the foregoing in mind, methods and apparatuses consistent with the present invention, which inter alia facilitates the operation of generators by protecting the ends of through-bolts from shorts. Provided is a through-bolt end covering boot that is comprised of electrically insulating material. If foreign conducting objects come into contact with the through-bolts, the boot will protect the machinery from shorts.

The boots can be produced from a variety of materials, but are particularly made from a cloth that is impregnated with a rubberized material. The boots can be molded to the particular shape of the end of the through-bolt, including any nut, washer and welds. Additional insulation may also be added to parts of the boot that are expected to carry the most voltage. The boots of the present invention can be added to generators as they are being built, or can be retro-fitted to them.

These and other objects, features, and advantages in accordance with the present invention are provided particular embodiments by an insulating boot for ends of through-bolts in electric generators that comprises a shaped insulating boot. The boot has an inner surface and an outer surface and an opening, where the inner surface is substantially free of protrusions. The inner surface of the shaped boot is within 0.01 to 0.5 inches (0.025–1.3 cm) larger than the shape of the end of a through-bolt to which the shaped boot will be applied. The shaped insulating boot has a breakdown voltage of at least 10 kV, and more particularly at least 30 kV, and the shaped boot is placed over the end of a through-bolt of an electric generator.

In a particular embodiment the inner surface of the boot is within approximately 0.05–0.10 inches (0.13–0.25 cm) larger than the shape of the end of the through-bolt to which the shaped boot will be applied, except at the tip of the boot, which is approximately 0.5 inches (1.3 cm) larger.

In another particular embodiment, the shaped insulating boot has a breakdown voltage of at least 40 kV. Additional layers of insulation may be applied to at least some portion of the inner surface, such as at a washer contact location and at a through-bolt tip contact location. The additional layers of insulation can be, for example, a Kapton™ tape.

In still another particular embodiment, loops are present on the outer surface of the boot. The loops can be integrally formed with the boot material, and can be made out of the same fibers that the boot is composed of. In another embodiment, the boot is capable of being removed and reapplied with substantial changes being made to the boot. Further, the boot may be penetrated by an electric probe without substantially compromising the voltage breakdown of the boot, is the hole is patched In another embodiment the present invention provides for an insulating boot for ends of through-bolts in electric generators that comprises a shaped insulating boot. The boot is formed from a cloth impregnated with a rubberized material, and the inner surface of the shaped boot is within 0.01 to 0.5 inches (0.025–1.3 cm) larger than the shape of the end of a through-bolt to which the shaped boot will be applied. The shaped insulating boot has a breakdown voltage of at least 10 kV, and the shaped boot is placed over the end of a through-bolt of an electric generator and the boot is removable. In particular embodiments the cloth is Kevlar™ and the rubberized material is a silicon rubber.

In another embodiment the present invention provides for an insulating boot for ends of through-bolts in electric generators that comprises a shaped insulating boot with an inner surface and an outer surface and an opening. An O-shaped ring is placed around the opening of the boot. The boot is formed from a cloth impregnated with a rubberized material and an additional layer of insulation is added to at least some portion of the inner surface. The inner surface of the shaped boot is within 0.01 to 0.5 inches (0.025–1.3 cm) larger than the shape of the end of a through-bolt to which the shaped boot will be applied, and the shaped insulating boot has a breakdown voltage of at least 10 kV. Loops are integrally formed from the cloth and present on the outer surface of the boot. The cloth is Kevlar™ and the rubberized material is a silicon rubber. The shaped boot may be compressed and the boot maintains an original memory shape after being compressed. When the shaped boot is placed over the end of a through-bolt of an electric generator it is removable. It is further capable of being pierced by diagnostic probes without significantly affecting the breakdown voltage, if subsequently patched.

Other embodiments of the present invention also exist, which will be apparent upon further reading of the detailed description.

BRIEF DESCRIPTION OF THE FIGURES

The invention is explained in more detail by way of example with reference to the following drawings.

DETAILED DESCRIPTION OF THE INVENTION

The present invention provides for a method and apparatus for guarding through-bolts of electric generators against the migration of laminations from flux traps. Flux traps are comprised of stacks of metal sheets which are clamped and/or bonded together. Generally they are bolted together, as well as to parts of the generator. However, the bolting of the flux traps is problematic, and a balance must be struck between adequately securing the flux trap laminations versus using a minimal amount of securing materials.

Over time, therefore, the flux trap laminations can unintentionally migrate. The migration, however, is not visible to generator operators since the flux traps are covered by a non-conducting material called a support cone. If laminations migrate and come into contact with through-bolts at both ends of the generator, then a short is created which causes large amounts of damage to the system. Note that the shorts can be be created by any conductive objects coming into contact with through-bolts, however flux trap laminations are the most likely source of this problem.

The present invention uses an insulating boot to cover the through-bolts and guard against conductive objects like the flux trap laminations. The boot is comprised of insulating materials so that if conductive objects come into contact with it, no electrical current will flow to the through-bolt.

The boot may take a variety of different shapes, but in particular embodiments they have an internal surface area that closely fits the shape of the end of through-bolt; the end of the through-bolt comprising the part of the through-bolt above the end plate, as well as the accompanying nut and washer. This close fit may be accomplished by molding using techniques known in the art. A small clearance around the internal surface helps in placing the boot on the end of the through-bolt, while maintaining a snug fit. For example, a clearance of approximately 0.05 inches (0.13 cm) on the internal surface is preferred. The top portion of the internal surface of the boot can have a larger clearance, for example approximately 0.5 inches (1.3 cm). This allows for slight variations in the lengths of the through-bolts. Additionally, the nuts and washers at the ends of the through-bolts are often welded, so the boot needs to accommodate these welds as well.

Figure 1A:
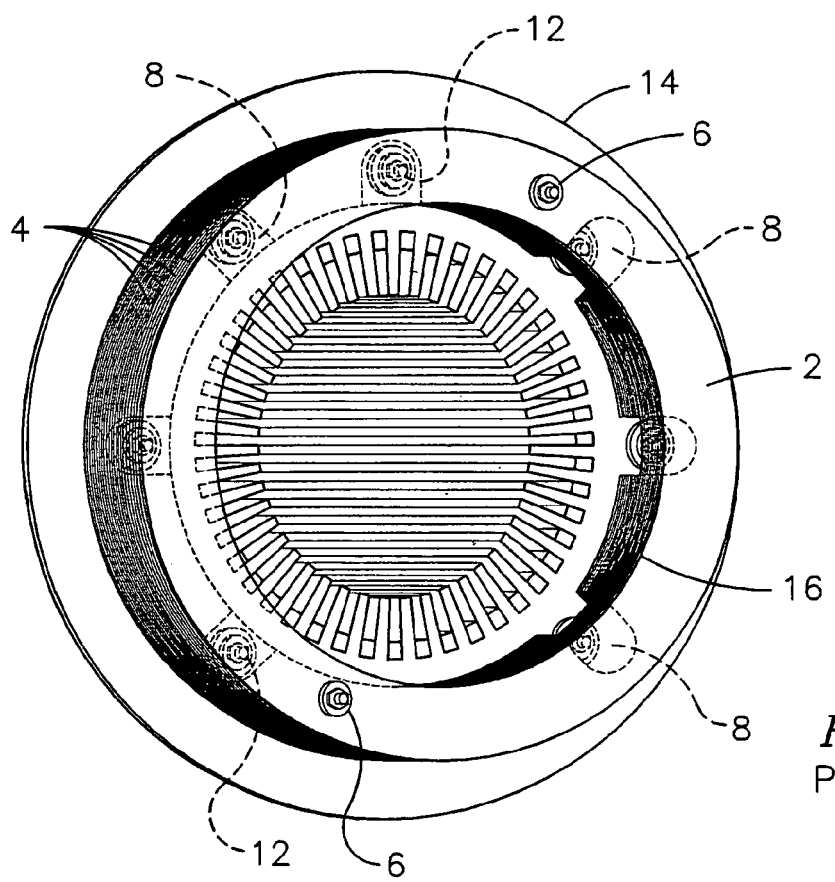
FIGS. 1A and 1B illustrate a typical set-up of a flux trap at the end of a generator core.
Figure 1B:
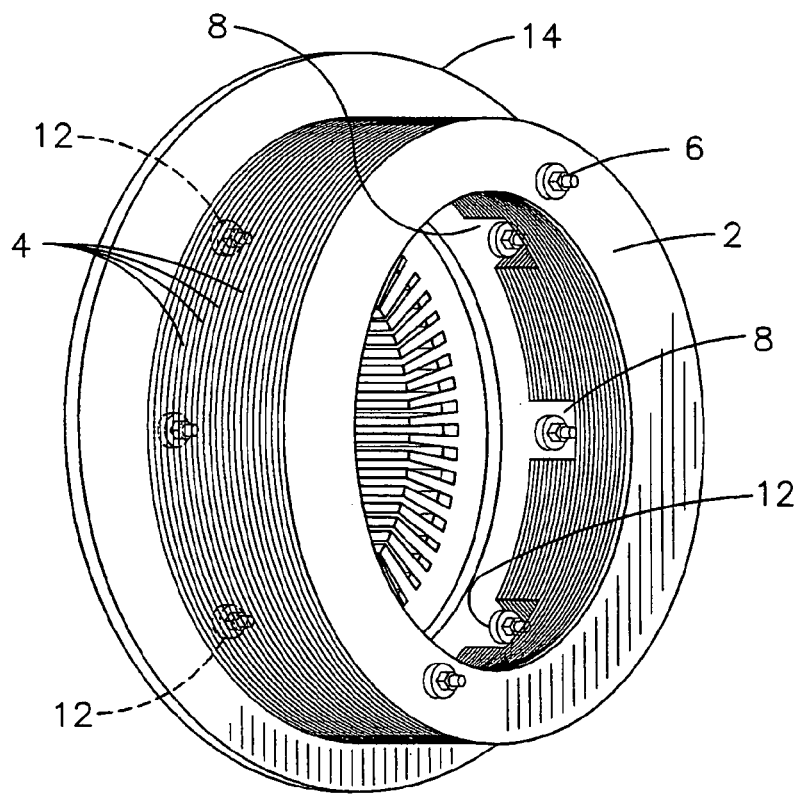
Figure 2:
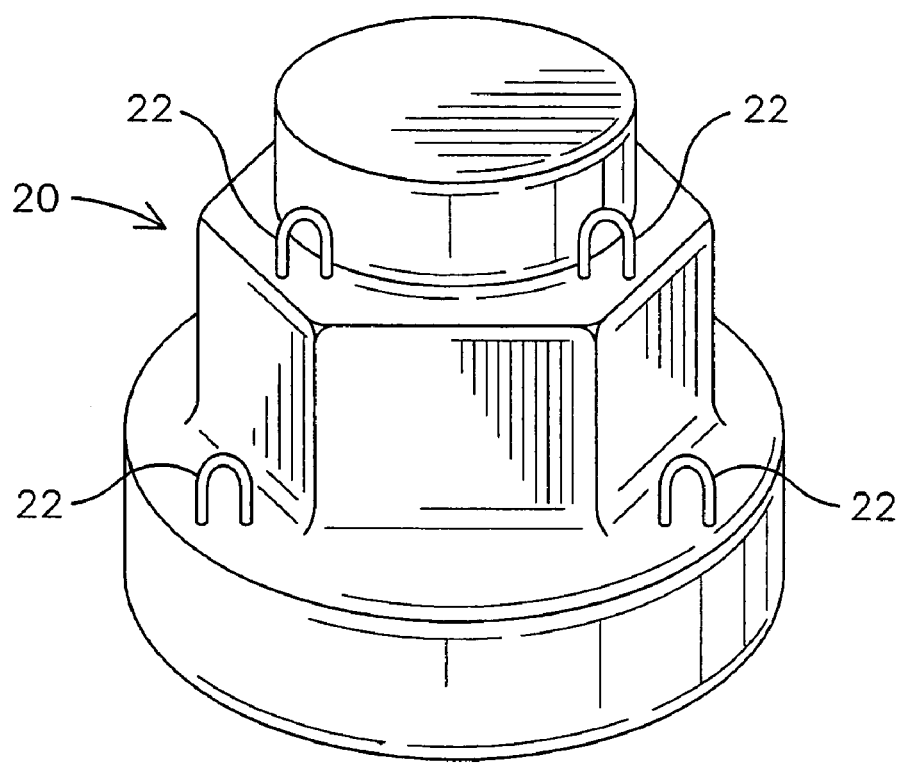
FIG. 2 illustrates a through-bolt insulating boot according to one embodiment of the present invention.

Referring to FIG. 2, one embodiment of the present invention is shown. In this embodiment the boot 20 closely resembles the end of the through-bolt, nut, washer apparatus. However, as long as the internal surface of the boot is a snug fit on the end of the through-bolt, the external surface may conform less to the shape of the through-bolt. Moldings and injections should therefore be calibrated to produce a more perfect internal surface, with less attention being paid to the external surface.

In the embodiment shown, loops 22 are included on the external surface of the boot to aid in the mounting process. These loops are especially important when attempting retro fits, as discussed below. The size of the loops shown in FIG. 2 are relatively small, however the size can vary. The loops can be attached to the boot after it is made, or be integrally formed are part of the structure. Making the loops out of the cloth material discussed above is a preferred embodiment. It is also possible that the loops are used to hook over or into something to hold the boot in position.

When placing the boot over the through-bolt it should maintain a snug fit. Since the boots will be in an inaccessible, or at least hard to access, place, they need to remain in place for long periods of time. Additional sealants, such as putties or silicon or rubber O-type rings, may be placed at the end of the boot to further complete the seal, although it is not necessary to be air-tight. The axial length of the boot is made slightly longer than the pocket length, so that when the boot is installed it is under compression, which helps to hold it firmly in place.

The composition of the boot may also vary. A particular embodiment comprises a cloth skeleton, such as Kevlar™, that is impregnated with an electrically resistive material, such as a silicon rubber. Silicon rubber is a particular material due to its resistivity to heat. Viton™, EPDM™. In this embodiment, the wall thickness of the boot is approximately 0.05–0.10 inches (0.13–0.25 cm). Due to impregnating techniques, however, wall thickness may not be entirely uniform, and deformities on the external surface of the boot can be expected and do not affect insulation performance. Impregnating techniques are varied, and include vacuum impregnations, pressure impregnation, as well as simpler techniques such as brushing liquid rubber onto the cloth base.

By making the boot out of a rubber impregnated cloth, probes may be inserted through the boot without significantly damaging its structure if the hole is filled in. The rubberized cloth is essentially resealed so that voltage resistance is maintained. Alternately, a small amount of additional rubber can be added to the hole to reseal it. This is useful for electrical tests on the through-bolts with probes. Probes being required since the ends of the through-bolts are in hard to access places once the generator is built.

Figure 3:
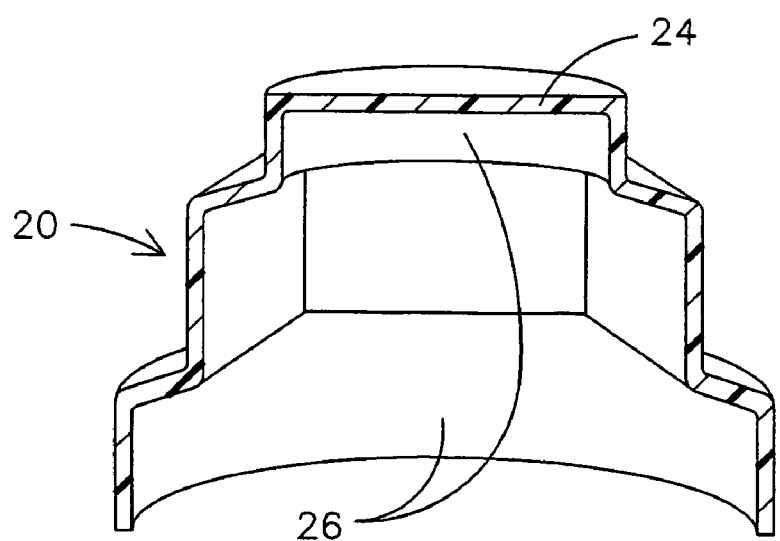
FIG. 3 illustrates a cross-sectional view of a through-bolt insulating boot according to one embodiment of the present invention.

Referring to FIG. 3, a cross-sectional view of one embodiment of the present invention is shown. For illustrative purposes, the thickness of the boot's wall 24 is proportionally large. As described above, the internal surface of the boot should be relatively smooth and tailored to the shape of the end-bolt. Places where the voltage is expected to be greatest 26 such as the protruding end of the through-bolt, or the washer ring, can be further reinforced. This can be done by an additional layer of insulating material, for example a Kapton™ tape.

The voltage breakdown of the boot described above using Kevlar™ cloth, silicon rubber and additional Kapton™ tape is in excess of 44,000 volts. This is therefore excess protection against migrating laminations, which were they to contact the through-bolt could create a large current capable of melting the though-bolt due to the applied voltage of approximately 1,000 volts.

It is a comparatively easy process to put the boots on generators that are being assembled. Pre-existing generators present more of a problem. Since the flux shield is covered by a cone, a small hole needs to be made in the cone at the locations of the through-bolts. The design of the boots mentioned above give them flexibility as well as a memory of their original shape. As such, the boots can be rolled up and shoved through relatively small holes. Adjustments in the amount and types of impregnated rubber can affect the flexibility of the boot.

Once the boot is pushed through the hole made in the cone, it will return to its original shape and can then be manipulated to fit over the end of the through-bolt. Since the hole created in the cone is small, long tool are necessary to manipulate the boot, and the loops on the outer surface of the boot become of particular utility at this point. Plugs can then be placed in the cone hole, and these same holes can be later used to probe the through-bolts. Placing a boot on one end of a through-bolt will insulate it from shorts. However, by placing the boots on both ends, the bolts are then double insulated, which adds greater protection.

In one embodiment the present invention provides for an insulating boot for ends of through-bolts in electric generators that comprises a shaped insulating boot. The boot has an inner surface and an outer surface and an opening, where the inner surface is substantially free of protrusions. The inner surface of the shaped boot is within 0.01 to 0.5 inches (0.025–1.3 cm) larger than the shape of the end of a through-bolt to which the shaped boot will be applied. The shaped insulating boot has a breakdown voltage of at least 10 kV, and the shaped boot is placed over the end of a through-bolt of an electric generator.

In a particular embodiment the inner surface of the boot is within approximately 0.05–0.10 inches (0.13–0.25 cm) larger than the shape of the end of the through-bolt to which the shaped boot will be applied, except at the tip of the boot, which is approximately 0.5 inches (1.3 cm) larger.

In another particular embodiment, the shaped insulating boot has a breakdown voltage of at least 40 kV. Additional layers of insulation may be applied to at least some portion of the inner surface, such as at a washer contact location and at a through-bolt tip contact location. The additional layers of insulation can be, for example, a Kapton™ tape.

In still another particular embodiment, loops are present on the outer surface of the boot. The loops can be integrally formed with the boot material, and can be made out of the same cloth that the boot is composed of. In another embodiment, the boot is capable of being removed and reapplied with substantial changes being made to the boot. Further, the boot may be penetrated by an electric probe without substantially compromising the voltage breakdown of the boot.

In another embodiment the present invention provides for an insulating boot for ends of through-bolts in electric generators that comprises a shaped insulating boot. The boot is formed from a cloth impregnated with a rubberized material, and the inner surface of the shaped boot is within 0.01 to 0.5 inches (0.025–1.3 cm) larger than the shape of the end of a through-bolt to which the shaped boot will be applied. The shaped insulating boot has a breakdown voltage of at least 10 kV, and the shaped boot is placed over the end of a through-bolt of an electric generator and the boot is removable. In particular embodiments the cloth is Kevlar™ and the rubberized material is a silicon rubber.

In another embodiment the present invention provides for an insulating boot for ends of through-bolts in electric generators that comprises a shaped insulating boot with an inner surface and an outer surface and an opening. An O-shaped ring is placed around the opening of the boot. The boot is formed from a cloth impregnated with a rubberized material and an additional layer of insulation is added to at least some portion of the inner surface. The inner surface of the shaped boot is within 0.01 to 0.5 inches (0.025–1.3 cm) larger than the shape of the end of a through-bolt to which the shaped boot will be applied, and the shaped insulating boot has a breakdown voltage of at least 10 kV. Loops are integrally formed from the cloth and present on the outer surface of the boot. The cloth is Kevlar™ and the rubberized material is a silicon rubber. The shaped boot may be compressed and the boot maintains an original memory shape after being compressed. When the shaped boot is placed over the end of a through-bolt of an electric generator it is removable. It is further capable of being pierced by diagnostic probes without significantly affecting the breakdown voltage.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the inventions which, is to be given the full breadth of the claims appended and any and all equivalents thereof.

What is claimed is:

1. An insulating boot for ends of through-bolts in electric generators comprising:
   a shaped insulating boot with an inner surface and an outer surface and an opening;
   wherein said boot is formed from a cloth impregnated with a rubberized material and wherein an additional layer of insulation is added to at least some portion of the inner surface;
   wherein said cloth is comprised of long molecular polyparaphenylene terephthalamide chains and wherein said rubberized material is a silicone rubber;
   wherein the inner surface of said shaped boot is within 0.01 to 0.5 inches (0.025–1.3 cm) larger than the shape of the end, of a through-bolt to which said shaped boot will be applied, and wherein said inner surface is substantially free of protrusions;
   wherein said shaped insulating boot has a breakdown voltage of at least 10 kV;
   wherein said shaped boot may be compressed and wherein said boot maintains an original memory shape after being compressed;
   wherein an O-shaped ring is located around the opening of said boot, and loops are integrally formed in the outer surface;
   wherein said shaped boot is placed over the end of a through-bolt of an electric generator.

2. The insulating boot of claim 1, wherein loops are present on the outer surface of said boot.

3. The insulating boot of claim 1, wherein said shaped insulating boot has a breakdown voltage of at least 40 kV.

4. The insulating boot of claim 1, wherein the inner surface of said boot is within approximately 0.05–0.10 inches (0.13–0.25 cm) larger than the shape of the end of the through-bolt to which said shaped boot will be applied, except at the tip of the boat, which is approximately 0.5 inches (1.3 cm) larger.

5. The insulating boot of claim 1, wherein said boat is capable of being removed and reapplied with substantial changes being made to said boat.

6. The insulating boot of claim 1, wherein said boot may be penetrated by an electric probe without substantially compromising the voltage breakdown of said boot.

7. An insulating boot for ends of through-bolts in electric generators comprising:
   a shaped insulating boot with an inner surface and an outer surface and an opening; and
   an O-shaped ring located around the opening of said boot;

wherein said boot is formed from a cloth impregnated with a rubberized material and wherein an additional layer of insulation is added to at least some portion of the inner surface;

wherein the inner surface of said shaped boot is within 0.01 to 0.5 inches (0.025–1.3 cm) larger than the shape of the end of a through-bolt to which said shaped boot will be applied;

wherein said shaped insulating boot has a breakdown voltage of at least 10 kV;

wherein loops are integrally formed from said cloth and present on the outer surface of said boot;

wherein said cloth is comprised of long molecular poly-paraphenylene terephthalamide chains and wherein said rubberized material is a silicon rubber;

wherein said shaped boot may be compressed and wherein said boot maintains an original memory shape after being compressed;

wherein said shaped boot is placed over the end of a through-bolt of an electric generator and wherein said boot is removable.

* * * * *